United States Patent
Von Strandtmann et al.

[15] 3,699,129
[45] Oct. 17, 1972

[54] 3-(METHYLTHIO) CHROMONE AND S-OXIDE DERIVATIVES

[72] Inventors: Maximilian Von Strandtmann, Rockaway Township; Sylvester Klutchko, Hackettstown; John Shavel, Jr., Mendham, all of N.J.

[73] Assignee: Warner-Lambert Company, Morris Plains, N.J.

[22] Filed: July 15, 1971

[21] Appl. No.: 165,757

[52] U.S. Cl. .............................. 260/345.2, 424/283
[51] Int. Cl. ............................................... C07d 7/34
[58] Field of Search ................................... 260/345.2

[56] References Cited

OTHER PUBLICATIONS

Becker et al., J. Am. Chem. soc. Vol. 85, pp. 3410–3414 (1963).

Primary Examiner—John M. Ford
Attorney—Albert H. Graddis et al.

[57] ABSTRACT

3-(Methylthio)chromone and S-oxide derivatives having the following structural formula are disclosed:

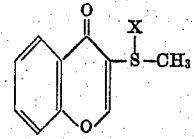

wherein X is O, $O_2$ or non-existant.

These compounds where X is non-existent are prepared as follows:

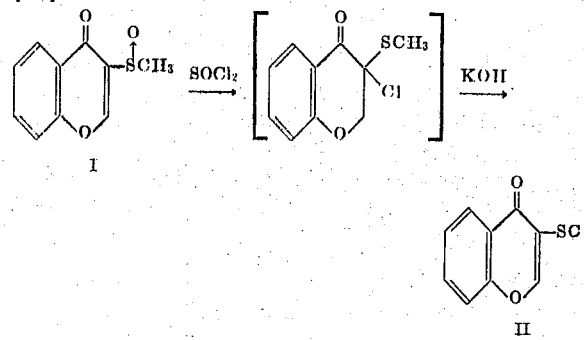

The S-oxides are prepared by oxidation of II or by ring closure of o-hydroxy-omega substituted acetophenone with triethylorthoformate using base catalysts.

The above compounds are useful in treating gastric hyperacidity.

5 Claims, No Drawings

3-(METHYLTHIO)CHROMONE AND S-OXIDE DERIVATIVES

The present invention relates to new and novel 3-(Methylthio)chromone and S-oxide derivatives having the following structural formula:

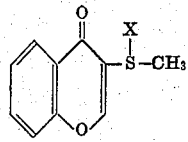

wherein X is $O, O_2$ or non-existent.

The compounds of this invention exhibit gastric antisecretory activity in mammals such as cats, dogs, and the like. Thus, for example, when they are tested in accordance with the procedure described by Shay et al., Gastroenterology 5, 43 (1945), they exhibit antisecretory activity at 50 mg/kg intraperitoneally in rats.

These compounds are indicated for example in conditions such as gastric hyperacidity. The dose required is within the above range one to three times daily. Such a dose regimen can, of course, be varied depending upon the severity, age, sex and the species of the mammal being treated by methods well known to the healing arts.

In order to use these compounds, they are formulated into dosage forms such as tablets, with diluents such as lactose, mannitol and the like. They are also formulated into dosage forms suitable for intramuscular or subcutaneous injections by combining with diluents such as peanut oil, water for injection and the like. These formulations are prepared by methods well known to the pharmacist's art.

According to the present invention, when X is non-existent, the compounds are prepared in accordance with the following scheme:

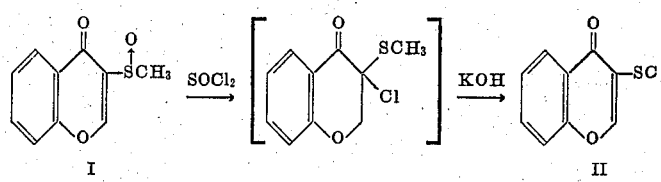

The S-oxides are prepared by oxidation of II or III (see Method A below) or by ring closure of o-hydroxy-omega-substituted acetophenone V or VI with triethylorthoformate using base catalysts (see Method B below). These reactions schemes are as follows:

METHOD A

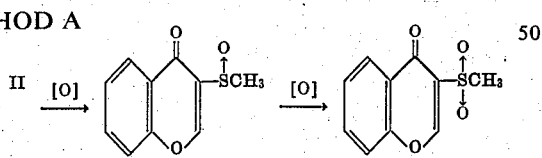

METHOD B

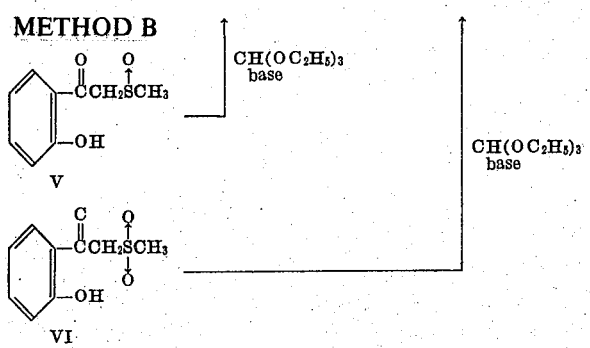

Starting compounds I and VI are prepared in accordance with our co-pending application "3-(Methylsulfinyl) and 3-(Methylsulfonyl)-4-Chromanone Derivatives" filed May 26, 1971, Ser. No. 147,184. Starting compound V is prepared by the procedure of Becker et. al. J. Amer. Chem. Soc., 85, 3410 (1963).

In order to further illustrate the practice of this invention, the following examples are included: (Room temperature used hereinafter is between 20° to 30° C).

EXAMPLE 1

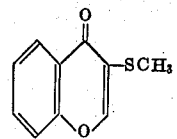

3-(methylthio)chromone

A quantity of 13.0 g (0.0619 mole) of 3-(methylsulfinyl)-4-chromanone was added portionwise to a stirred, cooled quantity of 150 ml of thionyl chloride over a period of five minutes, keeping the temperature at 20° C. After complete addition, the excess thionyl chloride was distilled off at reduced pressure. Ice water (300 ml) was added to the residue to destroy the excess thionyl chloride. Concentrated potassium hydroxide (about 10 M) was added to the oily mixture until strongly alkaline. The mixture was heated (without stirring) for about 10 minutes at about 70° C on the steam bath. The mixture was cooled and the resulting semisolid was filtered and washed well with water. The damp crude was dissolved in 100 ml of methylene chloride and this solution was dried over $K_2CO_3$, charcoaled, filtered and concentrated to about 10 ml volume when 100 ml of ether was added. The resulting crystals were filtered and washed with some ether; wt. 5.1 g (42.8 percent) m.p. 103°–105° C. Recrystallization from ethyl acetate gave pure material melting at 104°–106° C.

Anal. Calcd for $C_{10}H_8O_2S$: C, 62.48; H, 4.19; S, 16.68. Found: C, 62.64; H, 4.11; S, 16.45.

EXAMPLE 2

METHOD A

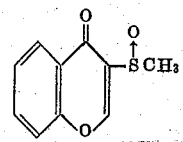

3-(methylsulfinyl)chromone

A solution of 3.79 g (0.0187 mole) of 85 percent m-chloroperbenzoic acid in 50 ml of chloroform was added dropwise to a stirred and cooled (10° C) solution of 3.6 g (0.0187 mole) of 3-(methylthio)chromone in 50 ml of chloroform. After complete addition (about 5 minutes) the mixture was allowed to warm to room temperature (about 15 minutes) and then was refluxed for 5 minutes. To the cooled solution added 100 ml of ether and extracted with 50 ml of 10% potassium carbonate solution. The organic phase was dried over K₂CO₃, charcoaled, filtered and concentrated to give 2.5 g (64.3 percent) near white crystals melting at 149°–151° C. Recrystallization from ethyl acetate gave pure white crystals melting at 150°–152° C.

Anal. Calcd for $C_{10}H_8O_3S$: C, 57.69; H, 3.87; S, 15.40. Found: C, 57.84; H, 3.88; S, 15.31.

METHOD B

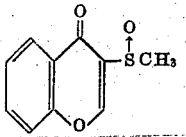

3-(methylsulfinyl)chromone

A mixture of 39.6 g (0.2 mole) of 2'-hydroxy-2-(methylsulfinyl) acetophenone, 150 ml of triethylorthoformate and 17.0 g (0.2 mole) of piperidine was heated with stirring to 115°–120° C. The resulting red solution was heated to 125° for 10 minutes allowing volatiles to boil off. The crystals that separated on cooling were filtered, washed with triethylorthoformate and then with ether. Wt. 4.2 g (10.1 percent). Recrystallization from ethyl acetate gave pure material, mp. 150°–152°, identical to the product isolated in Method A.

EXAMPLE 3

METHOD A

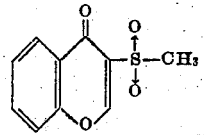

3-(methylsulfonyl)chromone

A solution of 0.5 g (0.0024 mole) of 3-(methylsulfinyl)chromone and 0.489 g (0.0024 mole) of 85 percent m-chloroperbenzoic acid in 50 ml of chloroform was maintained at reflux for 15 minutes. The cooled reaction mixture was extracted with 5 percent sodium bicarbonate, dried and concentrated to give 0.5 g (93.4%) of crude product. Recrystallization from chloroform-ether gave pure crystals, mp. 172°–173° C.

METHOD B

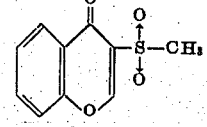

3-(methylsulfonyl)chromone

A mixture of 6.6 g (0.031 mole) of 2'-hydroxy-2-(methylsulfonyl) acetophenone, 50 ml of triethylorthoformate and 2 ml of piperidine was heated with stirring to 125°–135° C for 15 minutes, allowing the volatiles to distill off. On cooling the dark solution yielded 4.7 g (67.8 percent) of tan crystals melting at 169°–171° C. Recrystallization from chloroform-ether gave pure white crystals melting at 172°–173° C.

Anal. Calcd for $C_{10}H_8O_4S$: C, 53.56; H, 3.60; S, 14.30. Found: C, 53.71; H, 3.66; S, 14.58.

We claim:

1. A compound of the formula:

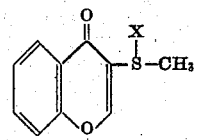

wherein X is O, O₂ or non-existant.

2. A compound according to claim 1 which is 3-(methylthio)chromone.

3. A compound according to claim 1 which is 3(methylsulfinyl)chromone.

4. A compound according to claim 1 which is 3(methylsulfonyl)chromone.

5. A method for the preparation of the compound of claim 1 where X is non-existant which comprises treating a compound of the formula:

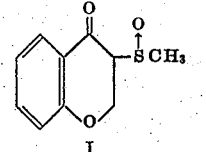

I with thionyl chloride and basifying the reaction mixture to obtain the desired product.

* * * * *